United States Patent [19]

Coirier et al.

[11] Patent Number: 5,695,157
[45] Date of Patent: Dec. 9, 1997

[54] DEVICE FOR ASSISTANCE IN THE PILOTING OF AN AIRCRAFT AT THE LANDING STAGE

[75] Inventors: Philippe Coirier, Merignac; Alain Goujon, Martignas Sur Jalle; Roger Parus, Merignac, all of France

[73] Assignee: Sextant Avionique, Meudon La Foret, France

[21] Appl. No.: 542,326

[22] Filed: Oct. 12, 1995

[30] Foreign Application Priority Data

Oct. 18, 1994 [FR] France ................ 94 12410

[51] Int. Cl.$^6$ ................................................ G05D 1/08
[52] U.S. Cl. ................................ 244/183; 244/175
[58] Field of Search ........................ 244/183, 185, 244/184, 186, 187, 188, 180, 181, 175; 364/434, 433, 428, 429, 430; 340/963, 976, 977; 342/33, 34, 35

[56] References Cited

U.S. PATENT DOCUMENTS

| | | |
|---|---|---|
| 3,437,292 | 4/1969 | Greene . |
| 3,626,163 | 12/1971 | Dommasch ............ 244/180 |
| 3,752,967 | 8/1973 | Victor .................... 244/183 |
| 3,980,258 | 9/1976 | Simeon .................. 244/186 |
| 4,030,065 | 6/1977 | Bateman ................ 244/180 |
| 4,385,354 | 5/1983 | Hornfeld et al. ........ 244/183 |
| 4,419,079 | 12/1983 | Georges et al. . |
| 4,832,287 | 5/1989 | Werjefelt . |
| 5,142,478 | 8/1992 | Crook .................... 364/428 |
| 5,233,524 | 8/1993 | Jackson ................. 364/428 |
| 5,260,702 | 11/1993 | Thompson . |

FOREIGN PATENT DOCUMENTS

| | | |
|---|---|---|
| 0 530 924 A2 | 3/1993 | European Pat. Off. . |
| WO82/00063 | 1/1982 | WIPO . |

Primary Examiner—Andres Kashnikow
Assistant Examiner—Tien Dinh
Attorney, Agent, or Firm—Oblon, Spivak, McClelland, Maier & Neustadt, P.C.

[57] ABSTRACT

This device relates to assistance in the piloting of an aircraft or helicopter in conditions of poor visibility, at the landing stage, during the final approach before touchdown. In case of poor visibility, the landing operations are facilitated by ILS radioelectrical installations that enable an automatic approach to the runway threshold. All that remains to be done is to perform a flare-out for touchdown which has to be done in a certain zone at the start of the runway. It happens, in the event of poor visibility, that this touchdown zone is difficult to assess. This causes risks of overshooting. The disclosed device is aimed at putting out an alarm in the event of overshooting of the nominal touchdown zone. It has means for the integration of the ground speed, means to detect the crossing of a lower value of a threshold of height with respect to the ground activating said integration means and means to detect a crossing of an upper value of a distance threshold acting on the signal delivered by the integration means and generating an alarm when there is no detection, by the load sensor, of an alighting of wheels.

4 Claims, 1 Drawing Sheet

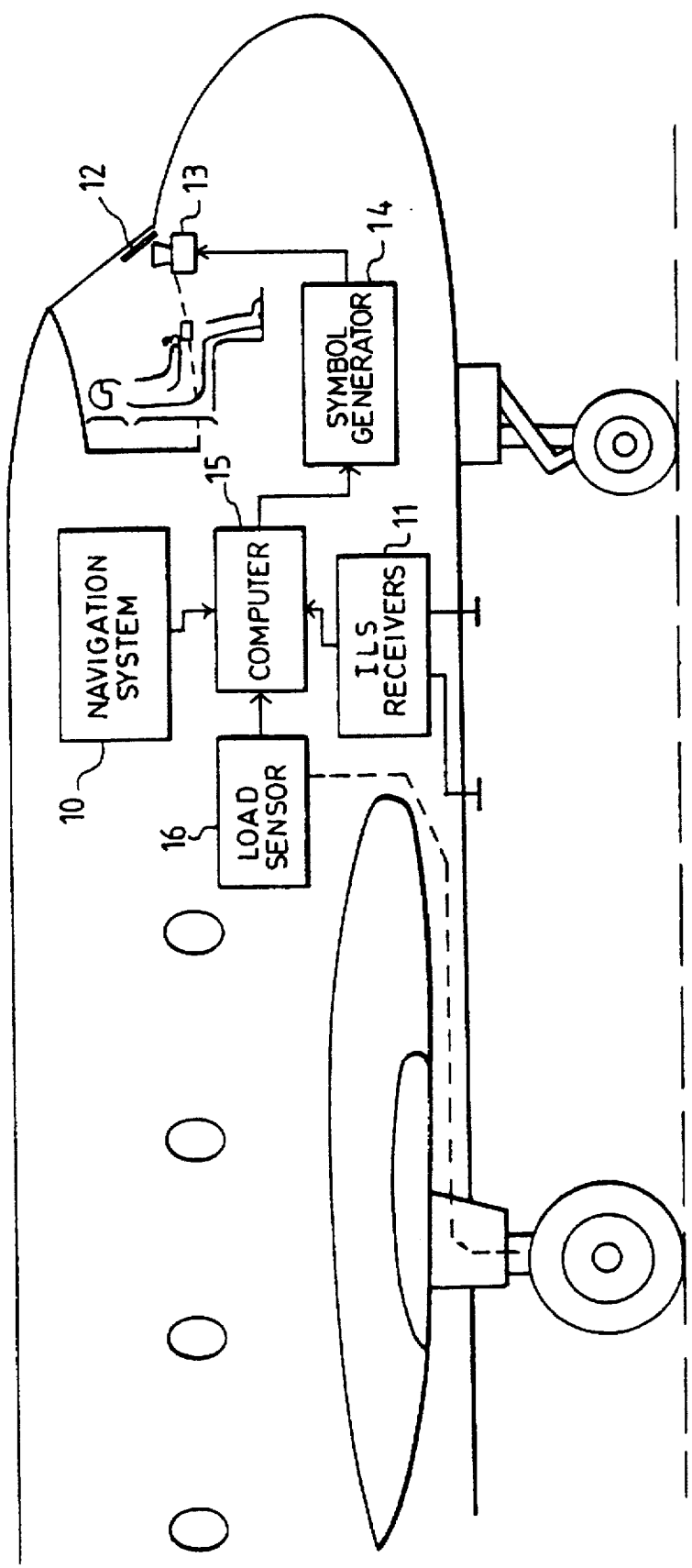

DEVICE FOR ASSISTANCE IN THE PILOTING OF AN AIRCRAFT AT THE LANDING STAGE

BACKGROUND OF THE INVENTION

Field of the Invention

The present invention relates to devices for assistance in the piloting of an aircraft in conditions of poor visibility, when landing, at the final approach stage before touchdown.

To facilitate landing in conditions of poor visibility, runways are generally equipped with ILS which are radio-electrical installations consisting of a localizer transmitter and a glide slope transmitter. The ILS guides the aircraft up to the threshold of the runway at a height of about 50 feet and it then remains for the aircraft to perform a flare-out operation for touchdown. This has to be done in a certain zone at the beginning of the runway called the nominal touchdown zone, which is difficult to assess visually in conditions of poor visibility. Now, it is necessary to avoid making a touchdown beyond this zone because that could have drastic consequences.

SUMMARY OF THE INVENTION

The aim of the present invention is to avoid cases of overshooting during landings.

An object of the invention is a device for assistance in the piloting, during a landing stage, of an aircraft provided with a navigation system that gives its speed and its height with respect to the ground and a load sensor that is fitted into its landing gear and detects the alighting of the wheels. The invention comprises means for the integration of the ground speed, means to detect the crossing of a lower value of a threshold of height with respect to the ground activating said integration means and means to detect a crossing of an upper value of a distance threshold acting on the signal delivered by the integration means and generating an alarm when there is no detection, by the load sensor, of an alighting of wheels.

BRIEF DESCRIPTION OF THE DRAWING

Other features and advantages of the invention shall appear from the following description of an embodiment given by way of an example. This description shall be given with reference to the appended drawing in which the single FIGURE gives a schematic view of an aircraft equipped with the device according to the invention.

MORE DETAILED DESCRIPTION

To avoid cases of overshooting which are especially dangerous in conditions of limited visibility, it is proposed to estimate the distance travelled by an aircraft from the threshold of a runway before touchdown and to put out an alarm as soon as the far end of the touchdown zone appears to have been overshot.

The passage through the runway threshold during landing is taken as being the equivalent of the crossing of the lower value of a threshold of height with respect to the ground. Indeed, even in conditions of poor visibility, it may be assumed that the aircraft arrives at the runway threshold with the right heading and altitude owing to the guidance by the ILS.

The touchdown is detected by means of a load sensor fitted into the landing gear which notes, for example, a sudden compression of the hydraulic shock absorbers of the landing gear.

The assessment of the distance travelled between the crossing of the runway threshold and touchdown is done not by a simple measurement of time which is not significant because of possible variations in landing configuration but by an integration of the ground speed of the aircraft. When the distance computed exceeds a set distance determined on the basis of the rules for operation in poor visibility, an alarm is given to the pilot.

The parameters considered are:

the height above the ground ALTRA given by a radio-altimeter forming part of the navigation system of the aircraft, the nominal height RATHRES at which the aircraft arrives at the runway threshold which is taken as the threshold value, the maximum distance MAXLAND whose crossing is permitted after the threshold of the runway is crossed without touchdown, and the ground speed SPDGND of the aircraft.

The condition of activation of the alarm is the crossing of the threshold MAXLAND by an increasing function of time $X(t)$ which is the integral of the ground speed SPDGND of the aircraft starting from the instant $t_0$ of the crossing of the height threshold RATHRES.

This is also expressed by:

$$X(t) > MAXLAND$$

with $$X(t) = \int_{t_0}^{t} SPDGND \times dt \qquad (1)$$

with t equal to $t_0$ when ALTRA becomes lower than RATHRES.

The FIGURE illustrates the general architecture of a piece of equipment installed on board an aircraft to display an overshooting alarm. The aircraft of which the front part with the cockpit can be seen is fitted out with a navigation system 10, ILS glide slope and localizer receivers 11 and a head-up display 12.

The navigation system 10 gives the usual information including, notably, ground speed and height with respect to the ground.

The ILS glide slope and localizer receivers 11 are used, in cooperation with the ILS glide slope and localizer transmitters with which the runways are equipped, to present this aircraft in the axis of a runway, at the threshold of this runway, with an accurate alignment and a descending slope of the order of three degrees.

The head-up display 12 is a conventionally designed collimator with a transparent screen placed pilot's line of sight, superimposed over the outside scene, on which the projection device 13 displays various reticules pertaining to piloting operations including, in the landing stage, an overshooting alarm.

The projection device 13 is controlled by a symbol generator 14 that receives updating commands from a computer 15 with a programmed logic connected to the navigation system 10, the outputs of the ILS glide slope and localizer receivers 11 and the output of a load sensor 16 sensitive to the pressure of the hydraulic shock absorbers of the main landing gear. The computer 15 which updates the different reticules displayed on the collimator 12 sees to the display of the overshooting alarm reticule by performing algorithms that carry out the following tasks:

the detection of the crossing of the minimum value of height above the ground RATHRES coinciding with the crossing of the threshold of a runway, the computation of the distance travelled from the runway threshold X(t) by integrating the ground speed SPDGND according to the relationship (1), and the activation of the overshooting alarm in the event of the overshooting of the maximum permitted distance without touchdown after passing through the threshold MAXLAND.

Naturally, the overshooting alarm may also be a light alarm or a sound alarm in the cockpit and it is possible that it may not require the obligatory use of a collimator. It may also be coupled with warnings or messages pertaining to flight over points of the ground determined by the crew or by the systems of the aircraft.

What is claimed is:

1. A device for assistance in the piloting, at a landing stage, of an aircraft provided with a navigation system that gives its speed and its height with respect to the ground and a load sensor that is fitted into its landing gear and detects the alighting of the wheels, wherein said device comprises means for the integration of the ground speed, means to detect the crossing of a lower value of a threshold of height with respect to the ground activating said integration means and means to detect a crossing of an upper value of a distance threshold acting on a signal delivered by the integration means and generating an alarm when there is no detection, by the load sensor, of an alighting of wheels.

2. A device according to claim 1, fitted into an aircraft provided with a head-up display, wherein said means to detect the crossing of an upper value of a distance threshold generate a visual alarm in the flight collimator.

3. A device according to claim 1, wherein said means to detect the crossing of an upper value of a distance threshold generate a light alarm.

4. A device according to claim 1, wherein said means to detect the crossing of an upper value of a distance threshold generate a sound alarm.

* * * * *